US00RE43924E

(19) United States
(12) Reissued Patent
Sawai et al.

(10) Patent Number: US RE43,924 E
(45) Date of Reissued Patent: *Jan. 15, 2013

(54) DISPLAY DEVICE WITH A TRANSPARENT OPTICAL FILTER

(75) Inventors: Takayuki Sawai, Tokyo (JP); Teturo Ueno, Tokyo (JP); Takashi Onioh, Tokyo (JP); Shigeyoshi Inuyama, Tokyo (JP); Kojyu Nagasaki, Tokyo (JP)

(73) Assignee: Dowa Holdings Co., Ltd., Tokyo (JP)

( * ) Notice: This patent is subject to a terminal disclaimer.

(21) Appl. No.: 12/805,806

(22) Filed: Aug. 19, 2010

Related U.S. Patent Documents

Reissue of:
(64) Patent No.: 6,020,945
Issued: Feb. 1, 2000
Appl. No.: 08/966,647
Filed: Nov. 10, 1997

U.S. Applications:
(63) Continuation of application No. 11/337,223, filed on Jan. 23, 2006, now Pat. No. Re. 41,833.

(30) Foreign Application Priority Data

Nov. 11, 1996 (JP) ..... 8-298773

(51) Int. Cl.
*G02F 1/1335* (2006.01)
*G09G 3/36* (2006.01)
*G09G 5/00* (2006.01)

(52) U.S. Cl. ..... 349/119; 349/12; 349/117; 345/104; 345/173

(58) Field of Classification Search ..... 349/12, 349/69, 112, 119, 117; 345/104, 173
See application file for complete search history.

(56) References Cited

U.S. PATENT DOCUMENTS
4,688,900 A 8/1987 Doane et al.
(Continued)

FOREIGN PATENT DOCUMENTS
JP U 61-76634 5/1986
(Continued)

*Primary Examiner* — James Dudek
(74) *Attorney, Agent, or Firm* — Oliff & Berridge, PLC

(57) ABSTRACT

Optical filter which is adapted to prevent the reflection of external light and improve a signal level of a signal sent from a display device by preventing attenuation thereof, and which is further adapted to prevent a change in hue of an image and to improve the hue, contrast and brightness of an image, thereby enhancing visibility. First, a liquid crystal display device (1) outputs light which is linearly polarized light. First linearly polarizing plate (2) is mounted in the filter in such a manner as to be adjusted to an axis of polarization of the linearly polarized light. Namely, the light outputted from the liquid crystal display device (1) passes through the first linearly polarizing plate (2) without being changed. The light passing through the first linearly polarizing plate (2) is then changed by a first quarter-wave phase difference plate (11) into circularly polarized light so that the phase difference between extraordinary light and ordinary light is (1/4) of the wavelength. Subsequently, light passes through a transparent touch panel (12) and further propagates through a second quarter-wave phase difference plate (7). At that time, a phase difference therebetween is caused by (−1/4) of the wavelength of the light in which the phase difference of (1/4) of the wavelength has been caused. Thus, when passing through the touch panel(12), the light is changed into linearly polarized light. Then, the light, which has propagated through the transparent touch panel (12) and the second quarter-wave phase difference plate (7), passes through the second linearly polarizing plate (6).

14 Claims, 10 Drawing Sheets

U.S. PATENT DOCUMENTS

| | | | |
|---|---|---|---|
| 5,461,236 | A | 10/1995 | Gram et al. |
| 5,506,706 | A | 4/1996 | Yamahara et al. |
| 5,617,228 | A | 4/1997 | Watanabe et al. |
| 5,729,319 | A | 3/1998 | Inou et al. |
| 5,774,197 | A | 6/1998 | Nakamura |
| 5,847,789 | A | 12/1998 | Nakamura et al. |

FOREIGN PATENT DOCUMENTS

| | | |
|---|---|---|
| JP | 1-118819 | 5/1989 |
| JP | 3-121523 | 5/1991 |
| JP | A 3-121523 | 5/1991 |
| JP | A 3-156420 | 7/1991 |
| JP | A 3-188420 | 8/1991 |
| JP | 4-243412 | 8/1992 |
| JP | A 5-34728 | 2/1993 |
| JP | A 5-127822 | 5/1993 |
| JP | A 5-281538 | 10/1993 |
| JP | A 5-289066 | 11/1993 |
| JP | A 6-19622 | 1/1994 |
| JP | Y2 6-24812 | 6/1994 |
| JP | 7-120730 | 5/1995 |
| JP | A 7-218904 | 8/1995 |
| JP | 8-122738 | 5/1996 |
| JP | A 8-129172 | 5/1996 |
| JP | A 8-204595 | 8/1996 |
| JP | 8-234162 | 9/1996 |
| JP | A 10-48625 | 2/1998 |

FIG.6

| ANGLE | PANEL AND LCD ARE PARALLEL | | | | | | | |
|---|---|---|---|---|---|---|---|---|
| | RIGHT | | LEFT | | ABOVE | | BELOW | |
| | Y-VALUE | Δ a*b* | Y-VALUE | Δ a*b* | Y-VALUE | Δ a*b* | Y-VALUE | Δ a*b* |
| 0 | 80.65 | 9.65 | 81.07 | 9.45 | 80.23 | 8.58 | 79.14 | 8.55 |
| 10 | 81.00 | 9.78 | 81.12 | 9.53 | 80.40 | 8.67 | 76.40 | 9.07 |
| 22 | 79.49 | 10.53 | 79.53 | 10.34 | 78.07 | 9.50 | 76.20 | 10.08 |
| 34 | 69.84 | 13.77 | 71.91 | 13.16 | 69.93 | 13.05 | 67.39 | 13.62 |
| 41 | 62.55 | 16.27 | 60.48 | 17.44 | 58.47 | 17.14 | 59.19 | 16.42 |
| 57 | 32.78 | 29.13 | 33.07 | 29.00 | 29.61 | 26.67 | 32.62 | 25.41 |

DISPLAY DEVICE WITH A TRANSPARENT OPTICAL FILTER

Matter enclosed in heavy brackets [ ] appears in the original patent but forms no part of this reissue specification; matter printed in italics indicates the additions made by reissue.

*This is a Continuation of Reissue application Ser. No. 11/337,223 filed Jan. 23, 2006 now U.S. Pat. No. Re.41,833, which merged with Reexamination Proceeding 90/007,728 on Jun. 16, 2006, and issued Oct. 19, 2010 as RE41,833. Both RE41,833 and this Continuation are reissues of U.S. Pat. No. 6,020,945.*

BACKGROUND OF THE INVENTION

1. Field of the Invention

The present invention generally relates to an optical filter mounted on the screen of a display adapted to emit linearly polarized light and, more particularly, to an optical filter disposed on a transparent touch panel or the like, which is mounted on a liquid crystal display apparatus.

2. Description of the Related Art

In recent years, among portable information devices such as a personal digital assistant (PDA), an electronic notebook (or pocketbook), a word processor, a notebook personal computer and a remote control device, a car navigation system, a bank terminal (for example, a cash dispenser), Internet Kiosks, and office automation (OA) equipment (for instance, point-of-sales (POS) terminals, facsimile (FAX) and copying machines), such devices of the type that utilize liquid crystals have been in increasing demand. Moreover, such devices of the type that further utilize transparent touch panels have been on the increase.

There have been the following three types of conventional transparent touch panels which are classified according to the kinds of materials of two composing layers thereof:

(α) (Film+Film) type;

(β) (Film+Glass) type; and (γ) (Glass+Glass) type.

Method of preventing the reflection of external light (or ambient light) to be employed by each of such conventional transparent touch panels is determined in accordance with the material (film or glass) of an operating section (or layer). Thus, the conventional transparent touch panels will be described hereinbelow by being classified according to the material of the operating section thereof.

First, the case, in which the material of the operating section of a touch panel is a film (namely, is of the aforementioned type (α) or (β)), will be described hereunder. As the method of preventing the reflection of external light, there have been developed a method of performing a non-glare treatment on the surface of a film of the operating section, and another method of applying AR (anti-reflective) coating to the surface of a film of the operating section.

(i) In the case of employing the method of performing the non-glare treatment on the surface of the film of the operating section, external light is dispersed or scattered by embossing, printing and applying a coating thereon and thus realizing a rugged surface of the film of the operating section.

(ii) Further, in the case of applying AR coating on the surface of the film of the operating section, the film is coated with a large number of layers respectively made of materials, such as $SiO_2$ and $MgF_2$ which are different in refractive index from one another. Thus, the reflection of external light in a visible range can be prevented. This utilizes the properties that the reflection of light occurs on the boundary surface of a substance and that when the light is incident from a substance having a small refractive index upon another substance having a large refractive index.

Next, the case, in which the material of the operating section is glass (namely, the aforementioned type (γ), will be described hereinbelow. In this case, as the method of preventing the reflection of external light on the touch panel, there have been devised a method of etching the surface of glass of the operating section, a method of sticking a special film to the surface of a glass layer of the operating section, a method of applying AR coating to the surface of glass of the operating section and a method of affixing an ordinary (non-polarizing) filter to the surface of the operating section.

(iii) In the case of the method of etching the surface of a glass layer of the operating section, external light is dispersed by realizing an uneven surface of the glass layer by etching thereof. This method utilizes similar properties as utilized in the case (i).

(iv) In the case of sticking a special filter to the surface of the glass layer of the operating section, a protecting film, the surface of the glass layer of which undergoes an embossing and a non-glare treatment, is stuck thereto. This method is similar to a method of sticking a smoke sheet (or film) to a window of a vehicle.

(v) In the case of the method of applying AR coating to the surface of the glass layer of the operating section, the glass layer of the operating section is coated with a large number of stacked layers which are different in refractive index from one another, similarly as in the aforementioned case (ii). Thus, the reflection of light in the visible range is prevented.

(vi) In the case of affixing an ordinary filter to the surface of the operating section, external light reflected by the surface of the glass layer of the operating section is return light. Thus, if the transmittance (or transmissivity) of the ordinary non-polarizing filter is 40%, the intensity of the reflected light is obtained by $0.4\times0.4=0.16$, and is, therefore, attenuated.

In addition to the aforementioned methods, in the case that the material of the operating section (namely, in the aforementioned case (γ), there have been developed a method of using a linearly polarizing plate, and a method of using a circularly polarizing plate which is a combination of a linearly polarizing plate and a phase difference plate.

(vii) Method of using the linearly polarizing plate is to prevent the reflection of external light by sticking the linearly polarizing plate to the surface of the glass layer of the operating section.

FIG. 11 schematically shows the configuration of a transparent touch panel using a linearly polarizing plate, which is mounted on the screen of a liquid crystal display device (LCD). Linearly polarizing plate 6 is stuck to the surface of a glass layer (an upper tin doped indium oxide (ITO) glass layer) of the operating section 4.

Transmissivity of the linearly polarizing plate 6 is usually not more than 45%. Thus, the intensity of the reflected light is obtained by $0.45\times0.45\approx0.2$, namely, attenuated in such a manner as to become not more than 0.2.

(viii) Method of using the circularly polarizing plate, a combination of a linearly polarizing plate and a phase difference plate is stuck to the glass layer of the operating section. Thus, the reflection of external light is prevented.

FIG. 12 schematically shows the configuration of a transparent touch panel using a circularly polarizing plate, mounted on the screen of a liquid crystal device.

Circularly polarizing plate 8 is stuck to a glass layer (namely, an upper ITO glass layer) 4. Circularly polarizing plate 8 is a combination of a linearly polarizing plate 6 and a quarter-wave phase difference plate 7. Quarter-wave phase difference plate 7 is stuck onto the glass layer 4 of the operating section. Moreover, another linearly polarizing plate 6 is stuck thereon.

With such a configuration, external light is changed into linearly polarized light, the electric field vector of which lies along Y-axis, after passing through the linearly polarizing plate 6. Next, if this linearly polarized light is divided into a vibration in an optical axis Z of the phase difference plate and a vibration and a vibration in Z-direction of an orthogonal axis Y. these vibrations coincide with an extraordinary ray and an ordinary ray propagating a doubly refracting element or crystal, respectively. Thus, after passing through the phase difference plate 7, the phase difference between waves vibrating in Y-direction and Z-direction, respectively, is (¼)-wavelength (namely, the linearly polarized light is changed into circularly polarized light). Part of light having passed through the circularly polarizing plate 8 is reflected by the surface of the touch panel. Then, the phase difference plate 7 causes again a phase difference of (¼)-wavelength between the waves vibrating in Y-direction and Z-direction, respectively, to which return light acting as the reflected light is divided. Consequently, a total phase difference between the waves vibrating in Y-direction and Z-direction, respectively, into which the reflected light is divided, is (½)-wavelength after passing through the phase difference plate 6, in comparison with the case that there is no phase difference between those into which the initial external light being incident upon the plate 6 is divided.

Linearly polarized light, the plane of vibration of which lies in Z-direction, is synthesized from two light waves, the phase difference between which is (½)-wavelength. Plane of polarization of this linearly polarized light is orthogonal to Y-direction. Thus, the light having passed through the phase difference plate 7 cannot further pass through the linearly polarizing plate 6 (in the upward direction).

Thus, the reflection of external light can be prevented by the circularly polarizing plate 8.

The aforementioned conventional methods, however, have the following problems.

First, in the case of the conventional methods described in the foregoing descriptions (i), (iii) and (iv), the degree of non-glare effects is enhanced so as to realize a rugged surface of the film or the glass layer, an image is blurred owing to the relation between the pixel size and pitch of liquid crystal display device. If the degree of non-flare effects is further enhanced, the displaying surface of the device becomes clouded due to the brightness of external light. Consequently, an image becomes hard to observe.

Further, if the diffuse reflectance of the surface of the film or glass layer is increased, the transmissivity thereof is decreased. Moreover, it is necessary for enhancing the brightness of an image to raise the brightness of backlighting light in the liquid crystal display device. This, however, results in increase in the power consumption of the device and in reduction in the life of a source of backlighting. Furthermore, even if the reflection of external light can be prevented, light cannot be prevented from being reflected by the inside (namely, ITO layer and the glass layer) of the touch panel. Thus, the visibility cannot be improved.

Further, in the case of the conventional methods described in the aforementioned descriptions (ii) and (v), AR coating is applied to the surface of the film and glass layer of the operating section by coating the surface thereof with two to five layers of substances which are different in refractive index from one another. However, such methods have the following defects. Surfacial hardness of the coating is low, so that the surface of the film and glass layer is fragile. Additionally, some materials of the surface coating have low chemical resistance. Surface of the coating is easily affected by chemicals.

Further, in the case of these methods, even when the reflection of external light can be prevented, light reflected by the inside (namely, ITO layer and the glass layer) of the touch panel cannot be prevented. Thus, the visibility can not be enhanced.

Moreover, in the case of the method described in the foregoing description (vi), the reflectance can be restrained to some extent by sticking a non-polarizing filter to the surface of the film or glass layer. However, the transmissivity of the non-polarizing filter is low. This method, thus, has defects in that the lightness of an image is lowered and that the visibility is lowered in light environment.

In the case of the method described in the foregoing description (vii), the transmissivity corresponding to the linearly polarizing plate is 30 to 45%. Thus, an amount of the reflected light is decreased by a reduction in an amount of incident external light, which is caused by using a linearity polarizing plate. However, components of a signal sent from a liquid crystal display device are attenuated. Thus, the visibility of an image is degraded.

In the case of the method described in the foregoing description (viii), a circularly polarizing plate obtained by combining a linearly polarizing plate with a phase difference plate is used. Thus, the transmissivity of the circularly polarizing plate is decreased in such a manner as to be lower than that of the linearly polarizing device. The brightness or lightness of an image is decreased as the transmissivity is lowered. Moreover, the visibility in light environment is degraded. Furthermore, the hue of an image is changed by the circularly polarizing plate.

The present invention is accomplished to solve the aforementioned problems of the prior art.

SUMMARY OF THE INVENTION

Accordingly, an object of the present invention is to provide an optical filter which prevents the reflection of external light and improves by preventing a reduction in signal level of a signal sent from a display device and prevents change in hue of an image and enhances the visibility by improving the hue, the contrast and the brightness.

To achieve the foregoing object, in accordance with an aspect of the present invention, there is provided an optical filter (hereunder sometimes referred to as a first optical filter of the present invention), which is mounted on a display device adapted to emit linearly polarized light, and comprises: a non-polarizing or lowly-polarizing member; a linearly polarizing plate; and first and second phase difference plates, wherein the aforesaid linearly polarizing plate and the aforesaid second phase difference plate prevent the reflection of external light which has passed through the aforesaid linearly polarizing plate and the aforesaid second phase difference plate and has been incident on the aforesaid display device, wherein light sent from the aforesaid display device is adapted in such a manner as to pass through the aforesaid second phase difference plate and the aforesaid linearly polarizing plate after passing the aforesaid first phase difference plate, and wherein an amount of a phase change caused by the aforesaid first and second phase difference plates is set so that the light sent from the aforesaid display device passes through the aforesaid linearly polarizing plate during the light is in an optically best state.

Thus, optical characteristics, such as the visibility, of the display device can be extremely enhanced.

In the case of an embodiment (hereunder sometimes referred to as a second optical filter of the present invention) of the first optical filter of the present invention, the aforesaid first and second phase difference plates are placed so that phase differences respectively caused by the aforesaid first and second phase difference plates are canceled, thereby enhancing the transmissivity.

In the case of an embodiment (hereunder sometimes referred to as a third optical filter of the present invention) of the first or second optical filter of the present invention, the aforesaid first and second phase difference plates are quarter-wave phase difference plates.

In the case of an embodiment (hereunder sometimes referred to as a fourth optical filter of the present invention) of one of the first to third optical filter of the present invention, the aforesaid non-polarizing or low-polarizing member is made of a high-polymer or glass.

In the case of an embodiment (hereunder sometimes referred to as a fifth optical filter of the present invention) of one of the first to fourth optical filter of the present invention, the aforesaid non-polarizing or low-polarizing member is shaped like a plate or film.

In the case of an embodiment (hereunder sometimes referred to as a sixth optical filter of the present invention) of one of the first to fifth optical filter of the present invention, the aforesaid display device is a liquid crystal display device.

In the case of an embodiment (hereunder sometimes referred to as a seventh optical filter of the present invention) of one of the first to sixth optical filter of the present invention, which is of a hermetically sealed structure, which is filled with inert gases.

In accordance with another aspect of the present invention, there is provided an optical filter (hereunder referred to as an eighth optical filter of the present invention) which comprises: a display device; a transparent touch panel device mounted on the screen of the aforesaid display device, wherein a second linearly polarizing plate and a second quarter-wave phase difference plate are provided on the surface of the aforesaid touch panel device in sequence, and wherein a first quarter-wave phase difference plate is provided in such a way as to be interposed between the aforesaid display device and the aforesaid transparent touch panel device.

In the case of an embodiment (hereunder sometimes referred to as a ninth optical filter of the present invention) of the eighth optical filter of the present invention, which further comprises: a first linearly polarizing plate interposed between the aforesaid display device and the first quarter-wave phase difference plate.

In the case of an embodiment (hereunder sometimes referred to as a tenth optical filter of the present invention) of the eighth or ninth optical filter of the present invention, wherein the aforesaid second linearly polarizing plate and the aforesaid second quarter-wave phase difference plate are stacked in such a manner as to be integral with each other and form a layered element, and wherein this layered element is bonded or fixed to the aforesaid transparent panel device by interposing bonding means or a spacer between a part of the aforesaid layered element facing a peripheral portion of the aforesaid transparent touch panel device, which is other than an operating section of the aforesaid transparent touch panel device, and the aforesaid peripheral portion of the aforesaid transparent touch panel device. In the case of an embodiment (hereunder sometimes referred to as an eleventh optical filter of the present invention) of the tenth optical filter of the present invention, the aforesaid bonding means is a pressure sensitive adhesive double coated film.

In the case of an embodiment (hereunder sometimes referred to as a twelfth optical filter of the present invention) of one of the eighth to eleventh optical filters of the present invention, the aforesaid display device is a liquid crystal display device.

In the case of an embodiment (hereunder sometimes referred to as a thirteenth optical filter of the present invention) of the twelfth optical filter of the present invention, the aforesaid liquid crystal display device is of the polymer dispersed type. In the case of an embodiment of the twelfth or thirteenth optical filter of the present invention, a single member is adapted to serve as two or more of apart of the aforesaid transparent panel device, the aforesaid first phase difference plate and the aforesaid liquid crystal display device.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 6 is a table for the comparison of the brightness Y-value and the hue $\Delta a^* b^*$ between a conventional example and the embodiment of the present invention;

DETAILED DESCRIPTION OF THE PREFERRED EMBODIMENTS

Hereinafter, optical filters according to the present invention, which are embodiments of the present invention, will be described in detail by referring to the accompanying drawings.

Figure 1:
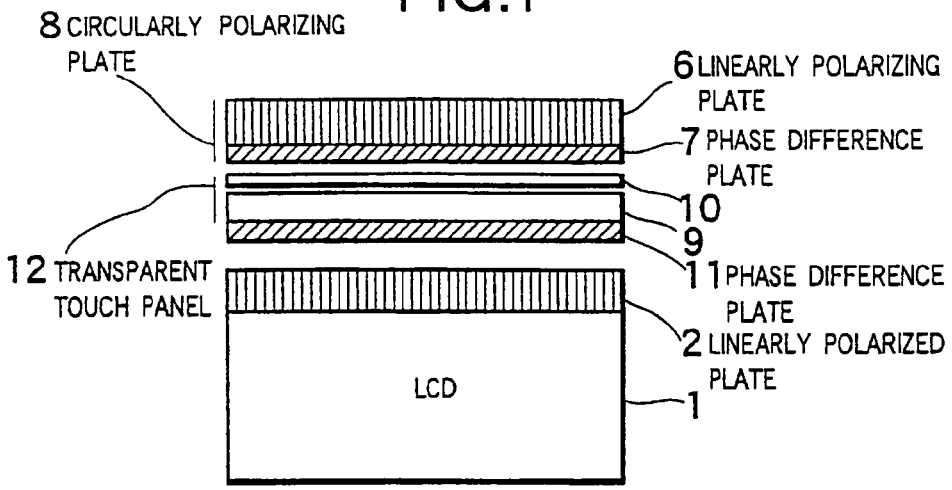
FIG. 1 is a schematic diagram illustrating the configuration of an optical filter which is an embodiment of the present invention.

FIG. 1 schematically shows the configuration of the optical filter which is this embodiment of the present invention. Incidentally, this embodiment is an example of application of the present invention to a liquid crystal display device provided with a touch panel device.

Liquid crystal display device 1 is usually equipped with first linearly polarizing plate 2. Further, a circularly polarizing plate 8, which is a combination of a second linearly polarizing plate 6 and a second quarter-wave phase difference plate 7, is mounted on a plate-like or film-like member made of polymer or glass of the operating section 10.

Most characteristic aspect of the present invention resides in that the optical filter of the present invention is provided with a first quarter-wave phase difference plate 11 in addition to the aforementioned composing elements. Light rays outputted from the liquid crystal display (LCD) device 1 are linearly polarized light rays, and the first linearly polarizing plate 2 is mounted thereon in such a manner as to be adjusted to the axis of polarization of the linearly polarized light. Namely, light rays outputted from the liquid crystal display device 1 passes through the first linearly polarizing plate 2 without being changed.

Figure 2:
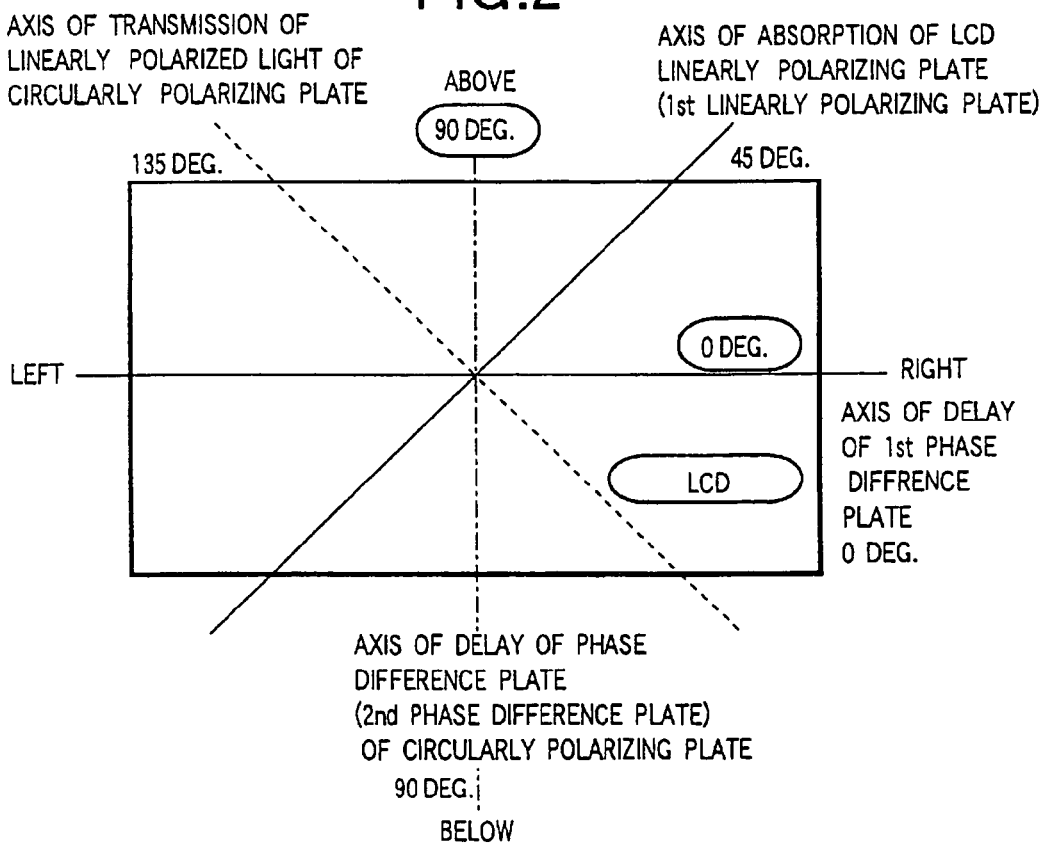
FIG. 2 is a diagram illustrating the relation between the mounting angles of the linearly polarizing plate and the phase difference plate of the optical filter of the embodiment of the present invention.

FIG. 2 shows the relation among the mounting angles of the first and second linearly polarizing plates 2 and 6 and the phase difference plates 7 and 11. Further, the second quarter-wave phase difference plate 7 and the first quarter-wave phase difference plate 11 are placed so that the difference between the mounting angles of the plates 7 and 11 is 90°.

Light rays having passed through the first linearly polarizing plate 2 without being altered is changed by the first quarter-wave phase difference plate 11 into (circularly polarized) light rays in which the phase difference between an extraordinary light ray and an ordinary light ray is (¼) of the wavelength. Subsequently, light rays having passed through the transparent touch panel 12 propagates through the second quarter-wave phase difference plate 7. At that time, a phase shift or difference of (−¼) of the wavelength is caused between the extraordinary light ray and the ordinary light ray, the phases of which have been previously made to be different from each other by (¼) of the wavelength thereof. Thus, the light ray having passed through the second quarter-wave phase difference plate 7 becomes linearly polarized light ray.

Light ray, which has been thus changed into linearly polarized light by passing through the transparent touch panel 12 and the second quarter-wave phase difference plate 7, passes through the second linearly polarizing plate 6. In the case of this embodiment, the caused phase differences are canceled by using two quarter-wave phase difference plates 11 and 7. Thus, light, which is incident upon the second linearly polarizing plate 6 from the liquid crystal display device 1, does not include a component thereof in a direction orthogonal to the axis of polarization of the second linearly polarizing plate 6. Conventional system is not provided with the quarter-wave phase difference plate 11. Thus, light, which is incident upon the second linearly polarizing plate 6 from the liquid crystal display device 1, includes a component thereof in a direction orthogonal to the axis of polarization of the second linearly polarizing plate 6. Further, this orthogonal component does not pass through the second linearly polarizing plate 6. Consequently, the visibility of the touch panel is very low.

Figure 3:
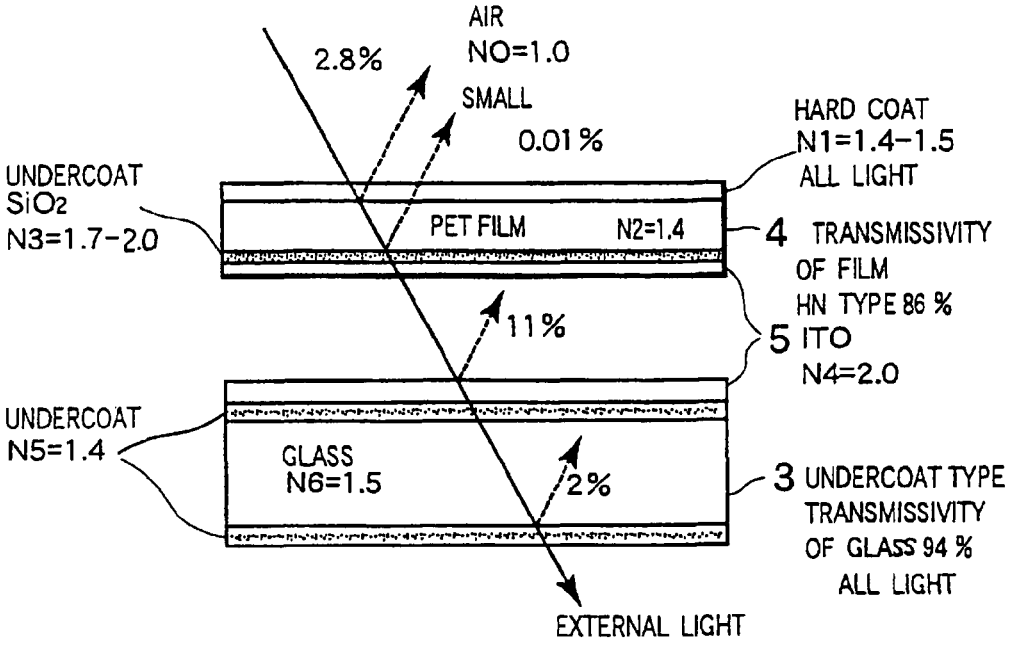
FIG. 3 is a diagram illustrating the configuration of a conventional transparent touch panel of the film type and the reflection of light therein.

FIG. 3 schematically illustrates the configuration of the conventional touch panel of the film type (namely, of the type that uses film as the operating section) and the reflection of external light.

Transmissivity of the touch panel of this type was as follows:

Actually measured value: 81.7% (at 550 nm)

Calculated value: 80.8% (all light)

Figure 4:
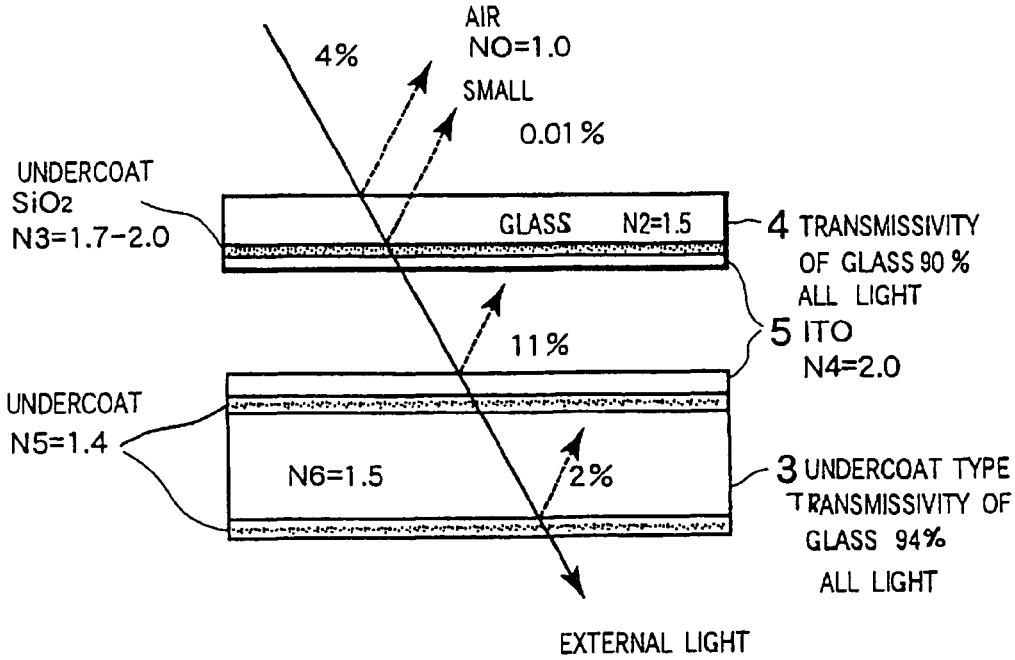
FIG. 4 is a diagram illustrating the configuration of a conventional transparent touch panel of the glass type and the reflection of light therein.

Thus, about 20% of the light was reflected and absorbed. Further, FIG. 4 schematically shows the conventional touch panel of the glass type (namely, of the type using glass in the operating section) and the reflection of external light. Transmissivity of the touch panel of this type is as follows:

Actually measured value: 85.7% (at 550 nm)

Calculated value: 84.6% (all light)

Thus, about 15% of the light was reflected and absorbed Further, the transmissivity of the touch panel of the circularly polarizing type, which was obtained by using a circularly polarizing plate in the conventional touch panel of the glass type and taking measures against external light; was 31.1% (calculated value). Thus, about 69% of the light was reflected and absorbed.

Figure 5:
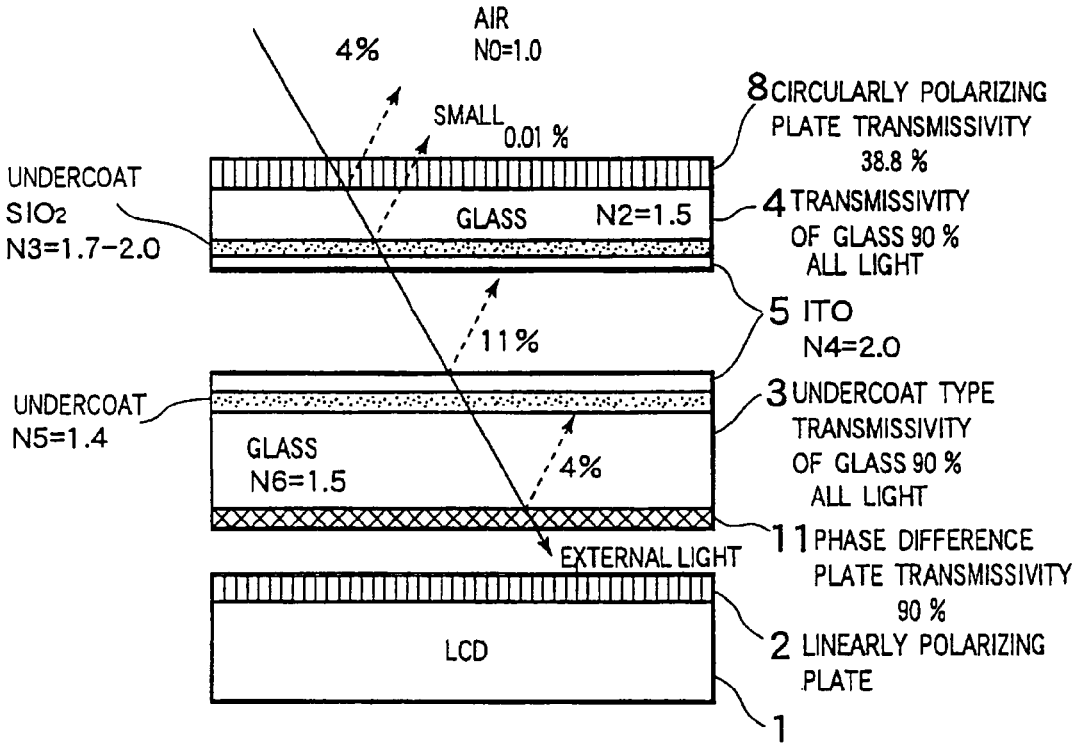
FIG. 5 is a diagram illustrating the configuration of an optical filter according to the embodiment of the present invention and the reflection of light therein.

FIG. 5 schematically illustrates a touch panel according to this embodiment of the (circularly polarizing plate+the phase difference type (namely, of the type that uses glass as the operating section, and further employs a circularly polarizing plate) and the reflection of external light:

Actually measured value: 67.4% (at 550 nm)

Calculated value: 72.9% (all light)

Thus, the transmissivity of this type is about 2.2 times that of the conventional circularly-polarizing type.

In the case of this embodiment, the visibility is evaluated by being defined as follows:

Visibility=Transmissivity×Reflectance

Incidentally, the visibility in each of the cases of the conventional touch panels of the film type, the glass type and the circularly polarizing type and of the (circularly polarizing plate+the phase difference plate) type is as follows:

| | Film Type | Glass Type | Circularly-Polarizing-Type | (Circularly-Polarizing-Plate + Phase-Difference-Plate) Type |
|---|---|---|---|---|
| Transmissivity (%) | 80.8 | 84.6 | 31.1 | 72.9 |
| Reflectance (%) | 14.1 | 15.7 | 3.0 | 3.0 |
| Visibility | 5.7 | 5.4 | 10.4 | 24.3 |

Figure 7:
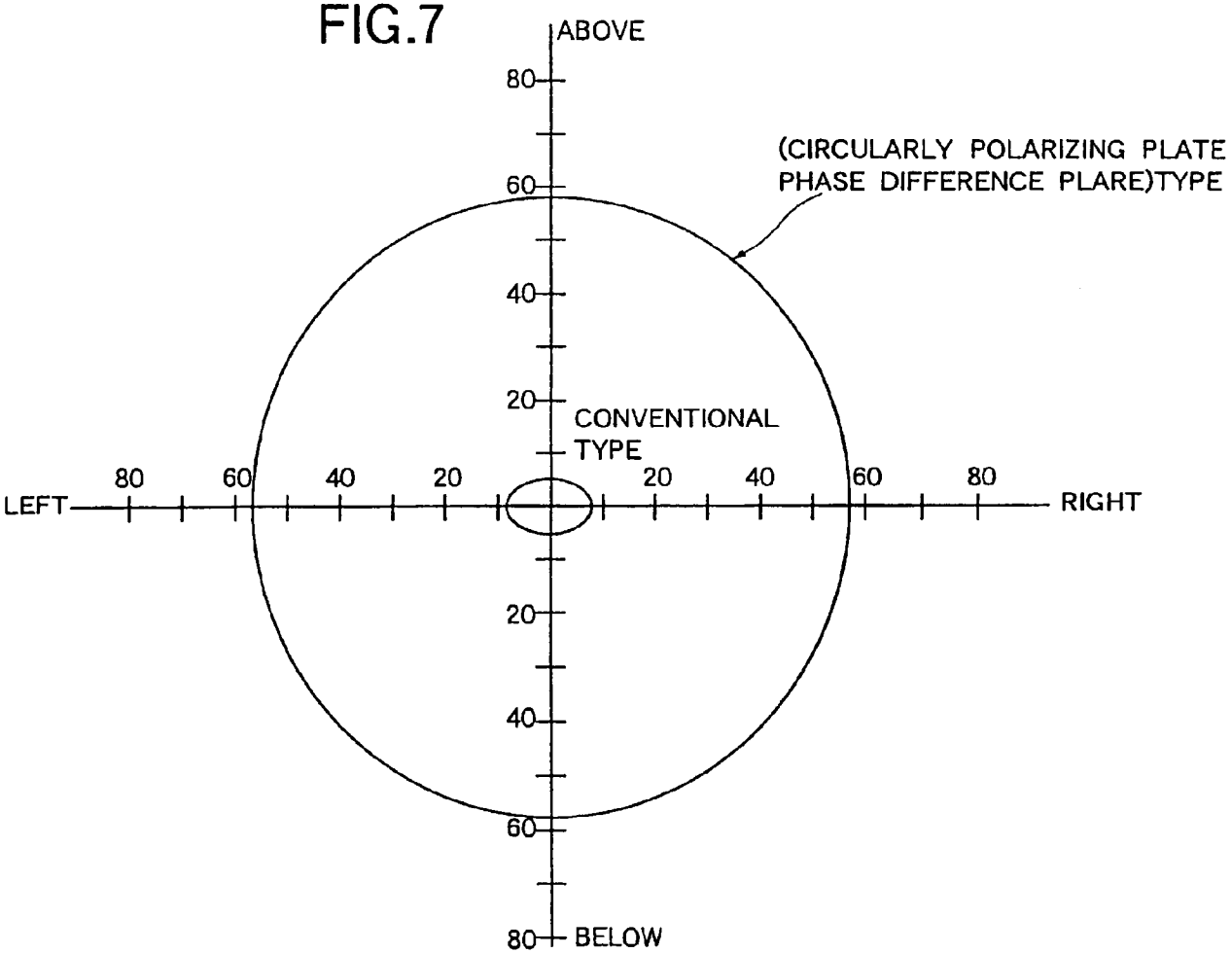
FIG. 7 is a diagram illustrating angles of field of the conventional example and the embodiment of the present invention.

As is seen from this table, the visibility is extremely enhanced in the case of the touch panel of (circularly-polarizing-plate+phase-difference-plate) type according to this embodiment. FIG. 6 shows the visibility (namely, the brightness Y-value nd the hue Δ a * b * ) when the touch panel of this mbodiment is viewed from four directions (namely, from above, below, left and right) and at inclination angles of 0, 10, 22, 34, 41 and 57° corresponding to each of the four directions. Incidentally, regarding the hue in the case of front visibility, the color difference Δ a * b * is used as a parameter corresponding to the hue, because the chromaticity a *=0 and b *=0 indicate achromatic color. As shown in FIG. 6, the brightness is high and the hue changes little over a wide range. Moreover, regardless of the inclination angle, a change to same hue occurs. Referring next to FIG. 7, there are shown angles of field in the cases of the conventional touch panels of the film type, the glass type and the circularly polarizing type and of the (circularly polarizing plate+the phase difference plate) type, for the purpose of comparison therebetween. Incidentally, the angle of field was measured by assuming that an object is visible in the case where Y-value is more than 40% and the color difference is less than 30%, as a reference for the measurement. It is apparent from this figure that, in the case of this embodiment, angles of field is large in comparison with the conventional touch panels the film type, the glass type and the circularly polarizing type.

EXAMPLE 1

Figure 8:
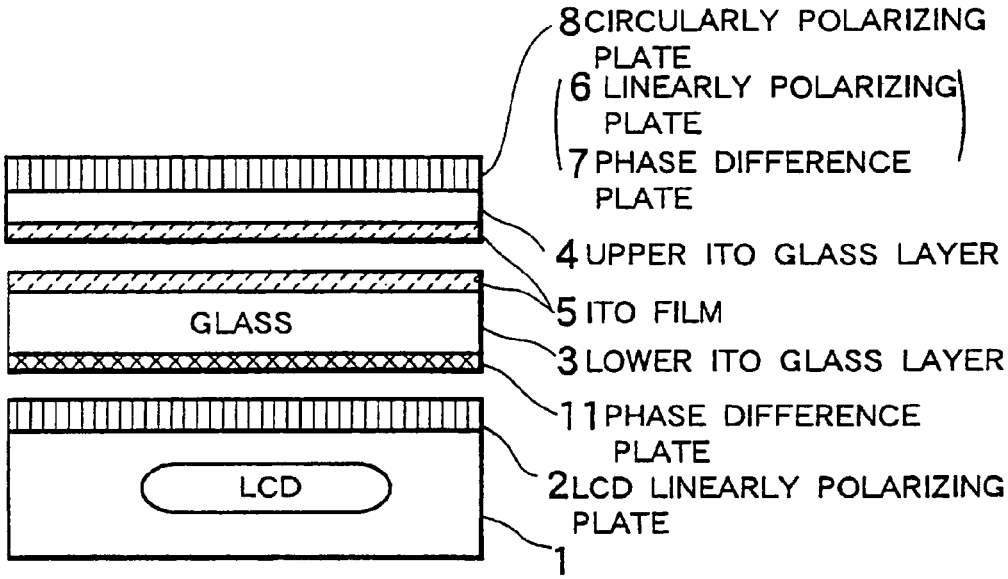
FIG. 8 is a diagram illustrating the configuration of an optical filter of "Example 1" of the present invention.

FIG. 8 schematically illustrates the configuration of an optical filter which is "Example 1" of the present invention. This is an example of application of the present invention to a liquid crystal display device provided with a touch panel. Transparent touch panel used in this example is of the type(γ), namely, (Glass+Glass)type. Visibility of this example is enhanced by using the circularly polarizing plate 8 (namely, a combination of the second linearly polarizing plate 6 and the second phase difference plate 7) and the first phase difference plate 11. Furthermore, the first linearly polarizing plate 2 is preliminarily mounted on the liquid crystal display device 1. Incidentally, the following materials are used in this example.

Circularly Polarizing Plate 8:

Material of a second (dye based) linearly polarizing plate 6:

ST-1822AP-AG3 manufactured by Sumitomo Chemical Company Limited

Material of a second phase difference plate 7:

SEF-¼ λ manufactured by Sumitomo Chemical Company Limited

Material of Transparent Touch Panel:

Glass3, 4 manufactured by DOWA VISUAL SYSTEM CO., LTD

Material of First Phase Difference Plate 11:

SEF-¼ λ manufactured by Sumitomo Chemical Company Limited

Reflection of external light by the surface of ITO layer 5 and glass layers 3 and 4 is prevented by the circularly polarizing plate 8 mounted on the upper portion of the optical filter. Moreover, a reduction in the transmissivity and a change in the hue can be prevented by the first phase difference plate 11 mounted on the lower glass layer 3.

EXAMPLE 2

Figure 9:
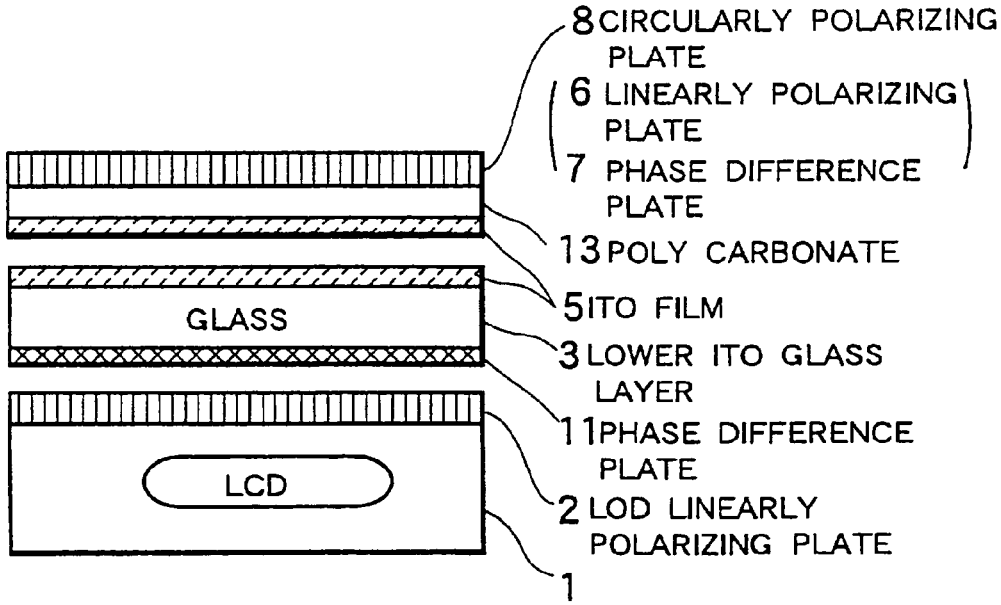
FIG. 9 is a diagram illustrating the configuration of an optical filter of "Example 2" of the present invention.

In the case of this example, a polycarbonate film is used instead of the upper glass layer 4 of "Example 1". To obtain a polycarbonate film having low polarization, the polycarbonate film is produced by a casting method. FIG. 9 illustrates the configuration of a touch panel of this example.

Transparent touch panel used in this example is of the type(β) namely, (Film+Glass)type. Visibility of this example is enhanced by using the circularly polarizing plate 8 (namely, a combination of the second linearly polarizing plate 6 and the second phase difference plate 7) and the first phase difference plate 11. Furthermore, the first linearly polarizing plate 2 is preliminarily mounted on the liquid crystal display device 1. Incidentally, the following materials are used in this example.

Circularly Polarizing Plate 8:

Material of a second (dye based) linearly polarizing plate 6:

ST-1822AP-AG3 manufactured by Sumitomo Chemical Company Limited

Material of a second phase difference plate 7:

SEF-0096 (Phase Difference 96 nm)

manufactured by Sumitomo Chemical Company Limited

Material of Transparent Touch Panel:

Film 13+Glass 3 manufactured by DOWA VISUAL SYSTEM CO., LTD

Polycarbonate film 13 (phase difference: 40 to 50 nm)

Material of First Phase Difference Plate 11:

SEF-¼ λ manufactured by Sumitomo Chemical Company Limited

Incidentally, this example is designed so that the total phase difference caused by the second phase difference plate 7 and the polycarbonate film 3 is equal to (¼) of the wavelength. Namely, the degree of polarization of the polycarbonate film 13 is very low. However, the polycarbonate film 13 exhibits the polarization corresponding to a phase difference of 40 to 50 nm. First phase difference plate causes a phase difference corresponding to (¼) of the wavelength. Thus, if a phase difference plate causing a phase difference corresponding to (¼) of the wavelength is used as the second phase difference plate 7, there occur subtle changes in optical properties, such as the hue and the transmissivity. To eliminate an error, the position of the second phase difference plate 7 is regulated. Moreover, the total phase difference caused by the second phase difference plate 7 and the polycarbonate film 13 is made to be equal to (¼) of the wavelength. This example can obtain advantageous effects similar to those of "Example 1".

EXAMPLE 3

Figure 10:
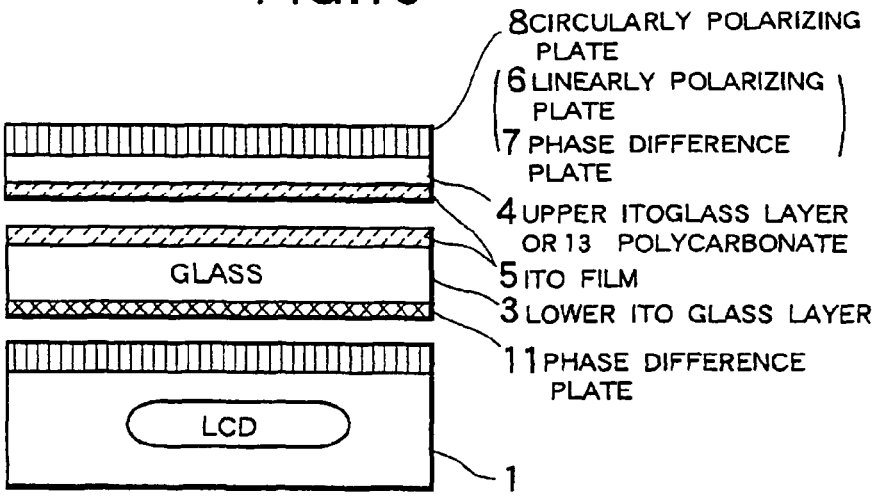
FIG. 10 is a diagram illustrating the configuration of an optical filter of "Example 3" of the present invention.
Figure 11:
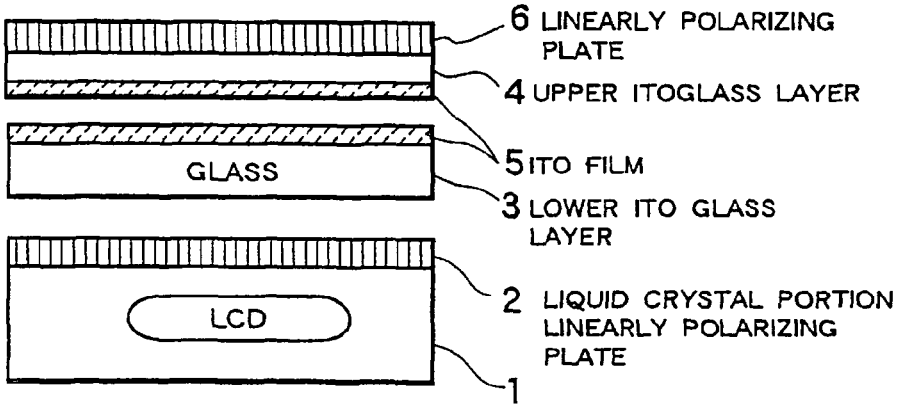
FIG.11 PRIOR ART
FIG. 11 is a diagram schematically illustrating the configuration of a transparent panel using a conventional linearly polarizing plate.
Figure 12:
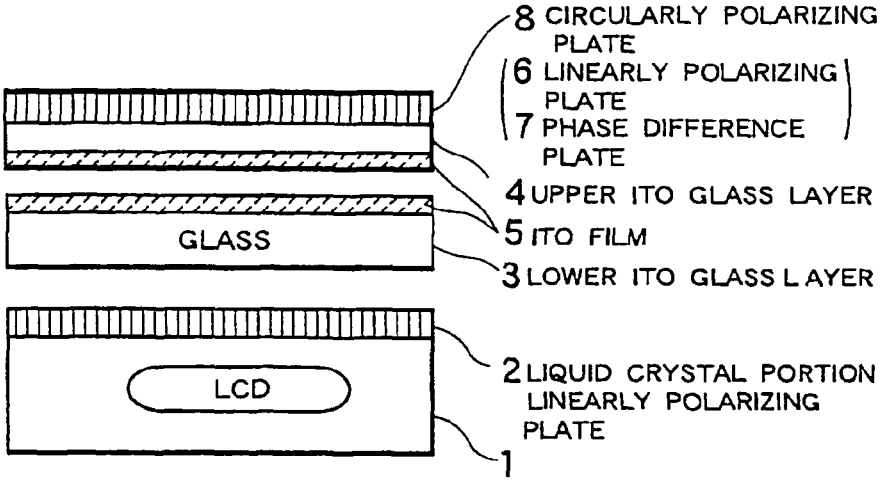
FIG.12 PRIOR ART
FIG. 12 is a diagram schematically illustrating the configuration of a transparent panel using a conventional circularly polarizing plate.

This example is obtained by removing the first linearly polarizing plate from each of "Example 1" and "Example 2". Namely, the first linearly polarizing plate mounted on the liquid crystal display device is omitted. Instead of this first linearly polarizing plate, the second linearly polarizing plate composing the circularly polarizing plate is used. Thus, the second linearly polarizing plate has the anti-reflection function and the functions of the first linearly polarizing plate usually mounted on the liquid crystal display device. FIG. 10 shows the configuration of this "Example 3". Further, there are two kinds of modifications of this "Example 3", namely, (Glass+Glass) type and (Film+Glass) type. Incidentally, this example of the (Glass+Glass) type uses the following materials.

Circularly Polarizing Plate 8:

Material of a second (dye based) linearly polarizing plate 6:

ST-1822AP-AG3 manufactured by Sumitomo Chemical Company Limited

Material of a second phase difference plate 7:

SEF-¼ λ manufactured by Sumitomo Chemical Company Limited

Material of Transparent Touch Panel:

Glass3, 4 manufactured by DOWA VISUAL SYSTEM CO., LTD

Material of First Phase Difference Plate 11:

SEF-¼ λ manufactured by Sumitomo Chemical Company Limited

Moreover, this example of the (Film+Glass) type uses the following materials.

Circularly Polarizing Plate 8:

Material of a second (dye based) linearly polarizing plate 6:

ST-1822AP-AG3 manufactured by Sumitomo Chemical Company Limited

Material of a second phase difference plate 7:

SEF-0096 (Phase Difference 96 nm)

manufactured by Sumitomo Chemical Company Limited

Material of Transparent Touch Panel:

Film13+Glass 3 manufactured by DOWA VISUAL SYSTEM CO., LTD

Polycarbonate film 13 (phase difference: 40 to 50 nm)

Material of First Phase Difference Plate 11:

SEF-¼ λ manufactured by Sumitomo Chemical Company Limited

This example can obtain advantageous effects similar to those of "Example 1" and "Example 2". In addition, the manufacturing cost can be reduced by omitting the first linearly polarizing plate 2. Simultaneously, the transmissivity can be enhanced.

EXAMPLE 4

Figure 13:
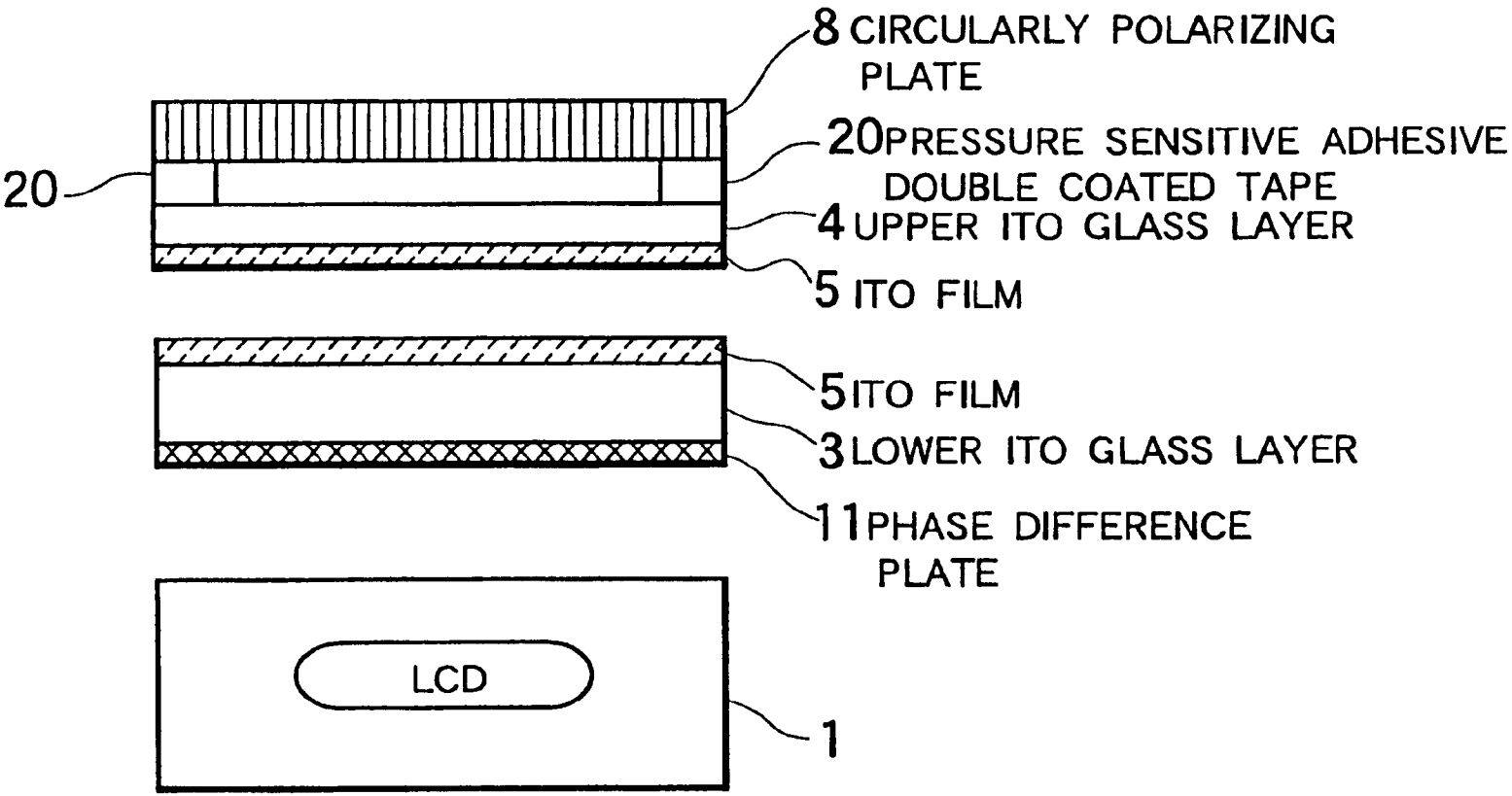
FIG. 13 is a diagram illustrating the configuration of an optical filter of "Example 4" of the present invention.

FIG. 13 is a diagram schematically showing the configuration of an optical filter which is "Example 4". This example is obtained by bonding and fixing only the peripheral portion of the circularly polarizing plate 8 of "Example 3" onto the upper ITO glass layer of the transparent touch panel by the use of pressure sensitive adhesive double coated tape 20.

As shown in FIG. 13, the double coated tape 20 is interposed between a portion of the circularly polarizing plate 8, which faces a peripheral portion of the upper ITO glass layer 4 other than the operating section thereof, and the peripheral portion of the upper ITO glass layer 4, which is other than the operating section. Thus, the circularly polarizing plate 8 is bonded and fixed to the upper ITO glass 4. In the case of this example, only the peripheral portion thereof other than the operating section is bonded and fixed. Thus, as compared with the conventional case where the entire surface of the polarizing plate is bonded and fixed, this example causes no problems even if foreign substances are mixed into the bonding portion. Moreover, even in the case that foreign substances enters the operating section, the disassembly thereof is relatively easily performed. Therefore, the removing of the foreign substances is relatively easily achieved. Incidentally, a spacer member may be used in place of the double coated tape, and further, a mechanism for nipping this spacer member and fixing the spacer member mechanically maybe provided in a modification of this example.

EXAMPLE 5

Figure 14:
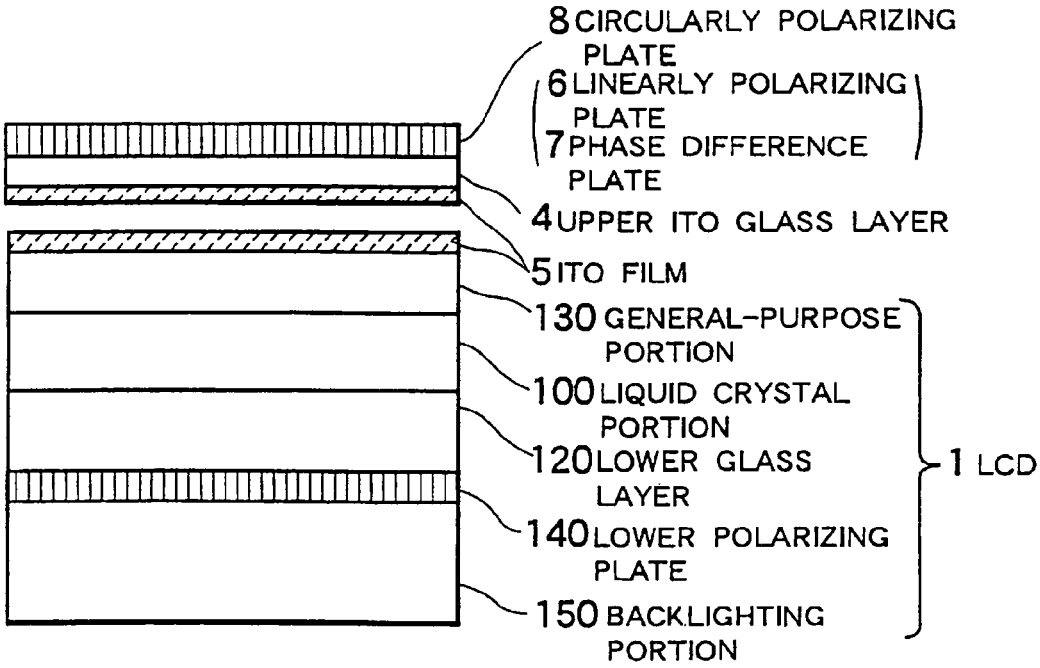
FIG. 14 is a diagram illustrating the configuration of an optical filter of "Embodiment 5" of the present invention.
Figure 15:
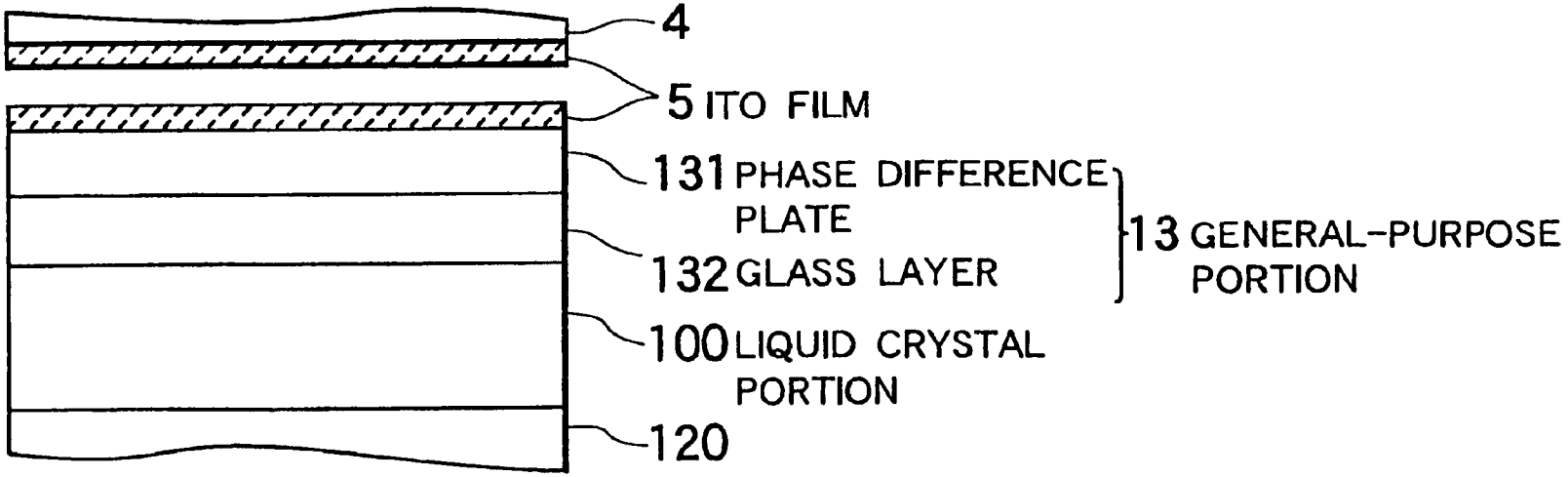
FIG. 15 is a diagram illustrating a modification of "Example 5" of the present invention.

FIG. 14 schematically shows the configuration of an optical filter which is "Example 4". This example is adapted so that a single member performs the functions of the lower ITO glass layer 3 of the transparent touch panel, the first phase difference plate 11 and the upper glass layer of the liquid crystal display device 1 of "Example 3". As shown in FIG. 14, a general-purpose member 130, on the surface of which ITO film 5 is formed in such a way as to face the upper ITO glass layer 4, is provided. This general-purpose member 130 serves as an upper glass layer which sandwiches a liquid crystal portion 10 together with a lower glass layer 120 and thus composes a liquid crystal cell portion. In this case, the general-purpose portion 130 further performs the function of the first phase difference plate. This general-purpose member 130 is constituted by, for example, providing a phase difference plate 131 on a glass plate 132 as illustrated in FIG. 15. Needless to say, the general-purpose member 130 may be constituted by a phase difference plate made of a transparent polymer material. Incidentally, the lower polarizing plate 140, and a backlighting portion 150 are mounted on the lower glass layer 120, sequentially. In the case of this example, the functions of the lower glass layer of the touch panel, the phase difference plate and the upper glass layer of the liquid crystal display device are performed by a single member. As compared with the case that these functions are performed by separated members, the transmissivity and the surface reflection can be reduced by amounts corresponding to the separated members. Furthermore, the visibility can be considerably enhanced. In addition, the entire structure of the optical filter can be simplified. Consequently, this example is very advantageous for manufacturers to reduce the manufacturing cost.

Other Embodiments

The present invention is not limited to the aforementioned embodiment. Various modification and alteration are allowed.

In the aforesaid embodiments, glass and polycarbonate film are used as the materials of the transparent touch panel. However, other materials may be used as long as having no polarization or a low degree of polarization. Further, the mounting angles of the phase difference plate and the linearly polarization plate are not limited to those illustrated in FIG. 2. Other angles may be employed as the mounting angles.

Further, to enhance the stability and the visibility, the transparent touch panel may be perfectly hermetically sealed and may be filled with inert gases. Moreover, as long as outputting linearly polarized light, any other display device other than a liquid crystal display device may be used as the display device. In the case of applying a liquid crystal display device, needless to say, what are called TFT liquid crystal, STN liquid crystal and TFT liquid crystal may be employed as liquid crystals of the liquid crystal display device. Especially, if using the polymer dispersed type liquid crystals, the use of polarizing plates in the liquid crystal display device itself is not always needed. Therefore, the visibility is further enhanced owing to the multiplier effects of the present invention and the liquid polymer dispersed type. Furthermore, the structure of the optical filter can be further simplified. The present invention can be applied to devices other than the transparent touch panel (and the optical filter), similarly. For example, a display window for a dust-proof case, and a protecting filter for a display device.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

[1. A display apparatus, comprising:

a display device adapted to emit linearly polarized light;

a transparent optical device mounted on said display device, said transparent optical device comprising a non-polarizing or low-polarizing member;

an anti-reflective layer, comprising a linearly polarizing plate and a phase difference plate, provided on a surface of said transparent optical device; and another phase difference plate, provided between said display device and said phase difference plate of the anti-reflective layer, that imparts a phase difference that cancels a phase difference imparted by said phase difference plate of the anti-reflective layer.]

[2. The display apparatus according to claim 1, wherein both of said phase difference plates are quarter-wave phase difference plates.]

[3. The display apparatus according to claim 1, wherein said non-polarizing or low-polarizing member is made of a high-polymer or glass.]

[4. The display apparatus according to claim 1, wherein said non-polarizing or low-polarizing member is shaped like a plate or film.]

[5. The display apparatus according to claim 1, wherein said display device is a liquid crystal display device.]

[6. The display apparatus according to claim 1, wherein said transparent optical device is a hermetically sealed structure that is filled with inert gases.]

[7. A display apparatus comprising:

a display device having a screen;

a transparent touch panel device mounted on the screen of said display device;

an anti-reflective layer, comprising a linearly polarizing plate and a phase difference plate, provided on a surface of said touch panel device; and another phase difference plate provided between said display device and said transparent touch panel device that imparts a phase difference that cancels a phase difference of light emitted from said display device imparted by said phase difference plate of the anti-reflective layer.]

[8. The display apparatus according to claim 7, further comprising another linearly polarizing plate interposed between the display device and said another phase difference plate.]

[9. The display apparatus according to claim 7, wherein said linearly polarizing plate and said phase difference plate of said anti-reflective layer are stacked in such a manner as to be integral with each other and form a layered element, and wherein said layered element is bonded or fixed to said transparent touch panel device by interposing bonding means or a spacer between a part of said layered element facing a peripheral portion of said transparent touch panel device, which is other than an operating section of said transparent touch panel device, and said peripheral portion of said transparent touch panel device.]

[10. The display apparatus according to claim 9, wherein said bonding means is an adhesive double coated film.]

[11. The display apparatus according to claim 7, wherein said display device is a liquid crystal display device.]

[12. The display apparatus according to claim 11, wherein said liquid crystal display device is of the polymer dispersed type.]

[13. The display apparatus according to claim 11, wherein a transparent member composing said transparent touch panel device comprises said another phase difference plate.]

*14. A display apparatus comprising:*

*a display device having a screen;*

*a transparent touch panel device that is non-polarizing or low-polarizing and imparts a phase difference of light emitted from the display device, the transparent touch panel device being mounted on the screen such that it is capable of being viewed from multiple directions and inclination angles;*

*an anti-reflective layer, attached directly to a surface of the transparent touch panel device, comprising a second linearly polarizing plate and a second phase difference plate that imparts a second phase difference of light emitted from the display device; and*

*a first phase difference plate, provided between the display device and the transparent touch panel device, that imparts a first phase difference of light emitted from the display device, the first phase difference being different from the second phase difference,*

*wherein a total phase difference caused by the second phase difference plate and the transparent touch panel device cancels the first phase difference.*

*15. The display apparatus according to claim 14, further comprising a first linearly polarizing plate interposed between the display device and the first phase difference plate.*

*16. The display apparatus according to claim 15, wherein the second linearly polarizing plate and the second phase difference plate of the anti-reflective layer are stacked in such a manner as to be integral with each other and form a layered element, and wherein the layered element is bonded or fixed to the transparent touch panel device by interposing bonding means or a spacer between a part of the layered element facing a peripheral portion of the transparent touch panel device, which is other than an operating section of the transparent touch panel device, and the peripheral portion of the transparent touch panel device.*

*17. The display apparatus according to claim 16, wherein the bonding means is an adhesive double coated film.*

*18. The display apparatus according to claim 15, wherein the display device is a liquid crystal display device.*

*19. The display apparatus according to claim 18, wherein the liquid crystal display device is of the polymer dispersed type.*

*20. The display apparatus according to claim 15, wherein a transparent member composing the transparent touch panel device comprises the first phase difference plate.*

*21. A display apparatus comprising:*

*a display device having a screen;*

*a transparent touch panel device that is non-polarizing or low-polarizing, mounted on the screen such that it is capable of being viewed from multiple directions and inclination angles;*

*an anti-reflective layer, attached directly to a surface of the transparent touch panel device, comprising a second linearly polarizing plate and a second phase difference plate that imparts a second phase difference of light emitted from the display device; and*

*a first phase difference plate, provided between the display device and the transparent touch panel device, that imparts a first phase difference of light emitted from the display device that cancels the second phase difference.*

*22. The display apparatus according to claim 21, further comprising a first linearly polarizing plate interposed between the display device and the first phase difference plate.*

*23. The display apparatus according to claim 22, wherein the second linearly polarizing plate and the second phase difference plate of the anti-reflective layer are stacked in such a manner as to be integral with each other and form a layered element, and wherein the layered element is bonded or fixed to the transparent touch panel device by interposing bonding means or a spacer between a part of the layered element facing a peripheral portion of the transparent touch panel device, which is other than an operating section of the transparent touch panel device, and the peripheral portion of the transparent touch panel device.*

*24. The display apparatus according to claim 23, wherein the bonding means is an adhesive double coated film.*

*25. The display apparatus according to claim 22, wherein the display device is a liquid crystal display device.*

*26. The display apparatus according to claim 25, wherein the liquid crystal display device is of the polymer dispersed type.*

*27. The display apparatus according to claim 22, wherein a transparent member composing the transparent touch panel device comprises the first phase difference plate.*

* * * * *